(12) United States Patent
Widdowson et al.

(10) Patent No.: US 7,668,400 B2
(45) Date of Patent: Feb. 23, 2010

(54) IMAGE LAYOUT CONSTRAINT GENERATION

(75) Inventors: Simon Widdowson, Palo Alto, CA (US); Eamonn O'Brien-Strain, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 689 days.

(21) Appl. No.: 11/496,847

(22) Filed: Jul. 31, 2006

(65) Prior Publication Data

US 2008/0025566 A1    Jan. 31, 2008

(51) Int. Cl.
G06K 9/36    (2006.01)
(52) U.S. Cl. .............. 382/276; 382/103; 382/175; 382/284; 348/231.2; 358/448
(58) Field of Classification Search .......... 382/276, 382/284; 715/517; 358/302, 448
See application file for complete search history.

(56) References Cited

U.S. PATENT DOCUMENTS

| | | | |
|---|---|---|---|
| 6,636,648 B2 * | 10/2003 | Loui et al. | 382/284 |
| 6,636,650 B1 | 10/2003 | Long et al. | |
| 2002/0095439 A1 | 7/2002 | Long et al. | |
| 2005/0071781 A1 | 3/2005 | Atkins | |
| 2005/0084136 A1 | 4/2005 | Xie et al. | |
| 2005/0163344 A1 | 7/2005 | Kayahara et al. | |
| 2006/0070026 A1 | 3/2006 | Balinsky et al. | |
| 2006/0230341 A1 | 10/2006 | Yamamoto | |
| 2006/0256134 A1 | 11/2006 | Widdowson | |
| 2007/0253028 A1 | 11/2007 | Widdowson | |
| 2008/0101761 A1 | 5/2008 | Widdowson | |
| 2008/0123993 A1 | 5/2008 | Widdowson | |

FOREIGN PATENT DOCUMENTS

| | | |
|---|---|---|
| EP | 0784294 A2 | 7/1997 |
| EP | 0784294 A3 | 7/1997 |
| EP | 1220531 A2 | 7/2002 |
| EP | 1431921 A2 | 6/2004 |
| EP | 1610542 A1 | 12/2005 |
| WO | WO2005/027504 | 3/2005 |

OTHER PUBLICATIONS

J. Geigel et al., "Using Genetic Algorithms for Album Page Layouts," IEEE Multimedia, IEEE Srvc. Ctr., New York, NY vol. 10, No. 4, Oct. 2003, pp. 16-26.
Jingdong, Wang et al: "Picture Collage" Computer Vision and Pattern Recognition, 2006 IEEE Computer Society Conference vol. 1, Jun. 17, 2006, pp. 347-354.

* cited by examiner

Primary Examiner—Tom Y Lu

(57) ABSTRACT

In a method for generating a dimensionally tractable set of image layout constraints, a selected constraint is applied to limit a dimension of a highly dimensional solution space. Through random selection one or more unconstrained dimensions of the highly dimensional solution space are identified which, when constrained, will further limit the highly dimensional solution space to a dimensionally tractable solution space. The tractability of the dimensionally tractable solution space is associated with a capability of a computational resource.

20 Claims, 7 Drawing Sheets

400

APPLYING A SELECTED CONSTRAINT TO LIMIT A DIMENSION OF A HIGHLY DIMENSIONAL SOLUTION SPACE.
410

↓

IDENTIFYING THROUGH RANDOM SELECTION ONE OR MORE UNCONSTRAINED DIMENSIONS OF THE HIGHLY DIMENSIONAL SOLUTION SPACE, WHICH WHEN CONSTRAINED WILL FURTHER LIMIT THE HIGHLY DIMENSIONAL SOLUTION SPACE TO A DIMENSIONALLY TRACTABLE SOLUTION SPACE, WHEREIN TRACTABILITY OF THE DIMENSIONALLY TRACTABLE SOLUTION SPACE IS ASSOCIATED WITH A CAPABILITY OF A COMPUTATIONAL RESOURCE.
420

↓

PROVIDING A SET OF IMAGE LAYOUT CONSTRAINTS FOR USE IN GENERATING A TRIAL IMAGE LAYOUT, WHEREIN THE SET OF LAYOUT CONSTRAINTS IS DERIVED FROM THE DIMENSIONALLY TRACTABLE SOLUTION SPACE.
430

400

---

APPLYING A SELECTED CONSTRAINT TO LIMIT A DIMENSION OF A HIGHLY DIMENSIONAL SOLUTION SPACE.
410

↓

IDENTIFYING THROUGH RANDOM SELECTION ONE OR MORE UNCONSTRAINED DIMENSIONS OF THE HIGHLY DIMENSIONAL SOLUTION SPACE, WHICH WHEN CONSTRAINED WILL FURTHER LIMIT THE HIGHLY DIMENSIONAL SOLUTION SPACE TO A DIMENSIONALLY TRACTABLE SOLUTION SPACE, WHEREIN TRACTABILITY OF THE DIMENSIONALLY TRACTABLE SOLUTION SPACE IS ASSOCIATED WITH A CAPABILITY OF A COMPUTATIONAL RESOURCE.
420

↓

PROVIDING A SET OF IMAGE LAYOUT CONSTRAINTS FOR USE IN GENERATING A TRIAL IMAGE LAYOUT, WHEREIN THE SET OF LAYOUT CONSTRAINTS IS DERIVED FROM THE DIMENSIONALLY TRACTABLE SOLUTION SPACE.
430

FIG. 4

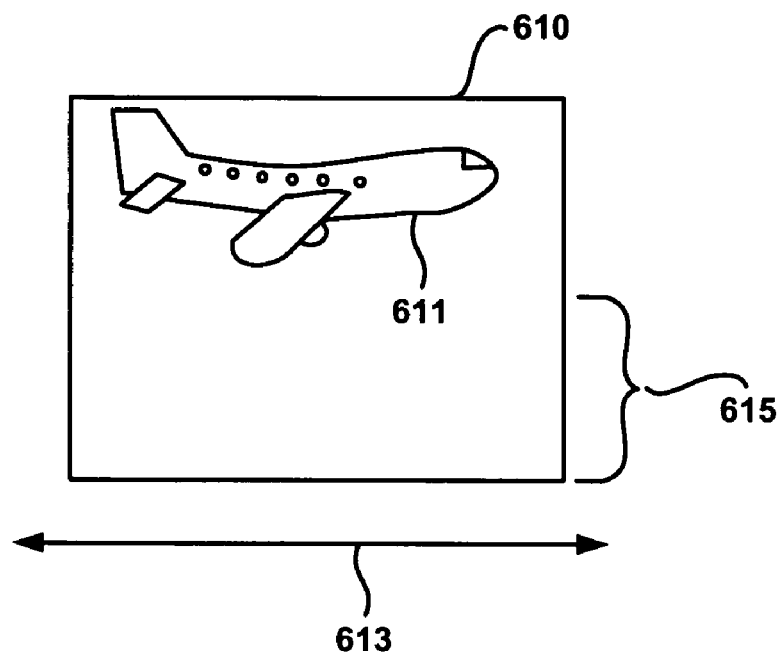
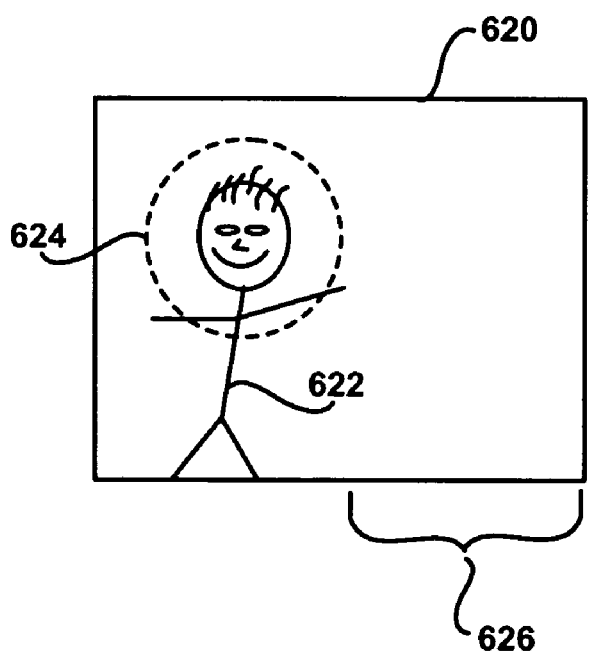
FIG. 6

700

UTILIZING A SELECTED LAYOUT CONSTRAINT TO NARROW A SET OF LAYOUT DIMENSIONS INTO A LIMITED SET OF LAYOUT DIMENSIONS.
705

UTILIZING AT LEAST ONE RANDOM LAYOUT CONSTRAINT TO NARROW THE LIMITED SET OF LAYOUT DIMENSIONS INTO A REDUCED SET OF LAYOUT DIMENSIONS.
715

EMPLOYING THE REDUCED SET OF LAYOUT DIMENSIONS TO SPECIFY A SET OF IMAGE LAYOUT CONSTRAINTS FOR A TIME VARIANT DISPLAY OF IMAGES.
725

PROVIDING THE SET OF IMAGE LAYOUT CONSTRAINTS FOR USE IN GENERATING A SET OF TRIAL LAYOUTS FOR THE TIME VARIANT DISPLAY OF IMAGES.
735

FIG. 7

IMAGE LAYOUT CONSTRAINT GENERATION

TECHNICAL FIELD

The present technology relates to image analysis and display. More specifically, embodiments of the present technology relate to image layout constraint generation.

BACKGROUND

Currently there exist numerous systems for generating image presentations such as slide shows. Such systems typically fall into one of two broad categories. The first category can be described as completely or substantially automated. The second category can best be described as manually intensive.

In the automated category, the available systems typically take a collection of images as an input and present a slide show (or some other image display) as an output. Some automated systems attempt in some fashion to analyze a large number of trial image layouts and somehow select the "best" of these trial layouts to present as an optimized display of images in a viewing region. However, many such automated solutions dispense with layouts of multiple images and simply present a single image at a time. Such automatically generated slide shows are typically very basic and repetitious, only occasionally adding some very basic image manipulation, such as panning or zooming in and out or moving an image. No real user input is usually required (or often allowed) other than the decision to generate the slide show. The output from such an automated system is typically predictable and formulaic, and as such, the resulting presentation style can become boring and repetitive and bland to a viewer after watching only a few slide shows (and sometimes after watching only several slides within a single slide show). Additionally, variation, such as it is often tends to distract from image content, rather than complementing it or emphasizing it.

In the manually intensive category, the user goes from having no control (or almost no control) over the image presentation to having nearly 100% control of every aspect of image presentation. For example, in such a manually intensive system, a user will typically need to control all or nearly all aspects of image selection, image positioning (x-positioning, y-positioning, and z-ordering), image movement, order of image presentation, image zoom, image scale, image pan, speed of presentation, and other such minutia for each image layout of a presentation. There is typically no automation or intelligent assistance by the computer system or program that is used to generate the slide show. This means that there is usually a very steep learning curve for the use of such a system. Therefore a novice user will typically generate only vary basic, often repetitive, slide shows. To generate more advanced slide shows, the user must invest a significant amount of time in training, practice, or both, and even still, capabilities of the user are deterministic of the presentation output. That is to say, user skill at using the image presentation system or program determines the quality of the slide show or other image presentation output. Therefore, in a manually intensive system it is not uncommon for a skilled user to spend hours (or longer) creating a slide show or other presentation from a group of images or video clips.

With the rapid rise in use of digital cameras and powerful viewing devices such as personal computers, media centers, and digital projectors, the need to display image content in an attractive manner is becoming increasingly prevalent. However, as described, current systems for generating image presentations, such as slide shows, typically produce bland results when automated or else require significant effort and time on the part of a user.

BRIEF DESCRIPTION OF THE DRAWINGS

The accompanying drawings, which are incorporated in and form a part of this specification, illustrate embodiments of the invention and, together with the detailed description, serve to explain principles discussed below:

FIG. 4 is a flow diagram of an exemplary method for generating a dimensionally tractable set of image layout constraints, according to one embodiment of the present invention.

FIG. 6 shows exemplary images upon which embodiments of the present invention may be practiced.

FIG. 7 is a flow diagram of an exemplary method for generating image layout constraints, according to one embodiment of the present invention.

The drawings referred to in this description should not be understood as being drawn to scale unless specifically noted.

DETAILED DESCRIPTION

Reference will now be made in detail to embodiments of the present invention, examples of which are illustrated in the accompanying drawings. While the present invention is described in conjunction with various embodiments, it will be understood that they are not intended to limit the present invention to these embodiments. On the contrary, the presented technology is intended to cover alternatives, modifications and equivalents, which may be included within the spirit and scope the various embodiments as defined by the appended claims. Furthermore, in the following detailed description, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present invention.

Unless specifically stated otherwise as apparent from the following discussions, it is appreciated that throughout the present detailed description, discussions utilizing terms such as "applying", "identifying", "basing", "generating", "utilizing", "employing", "determining", "providing", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical, virtual, and mechanical computers. Additionally, it should be understood that in embodiments of the present invention, one or more of the steps can be performed manually.

Example Computer System Environment

Figure 1:
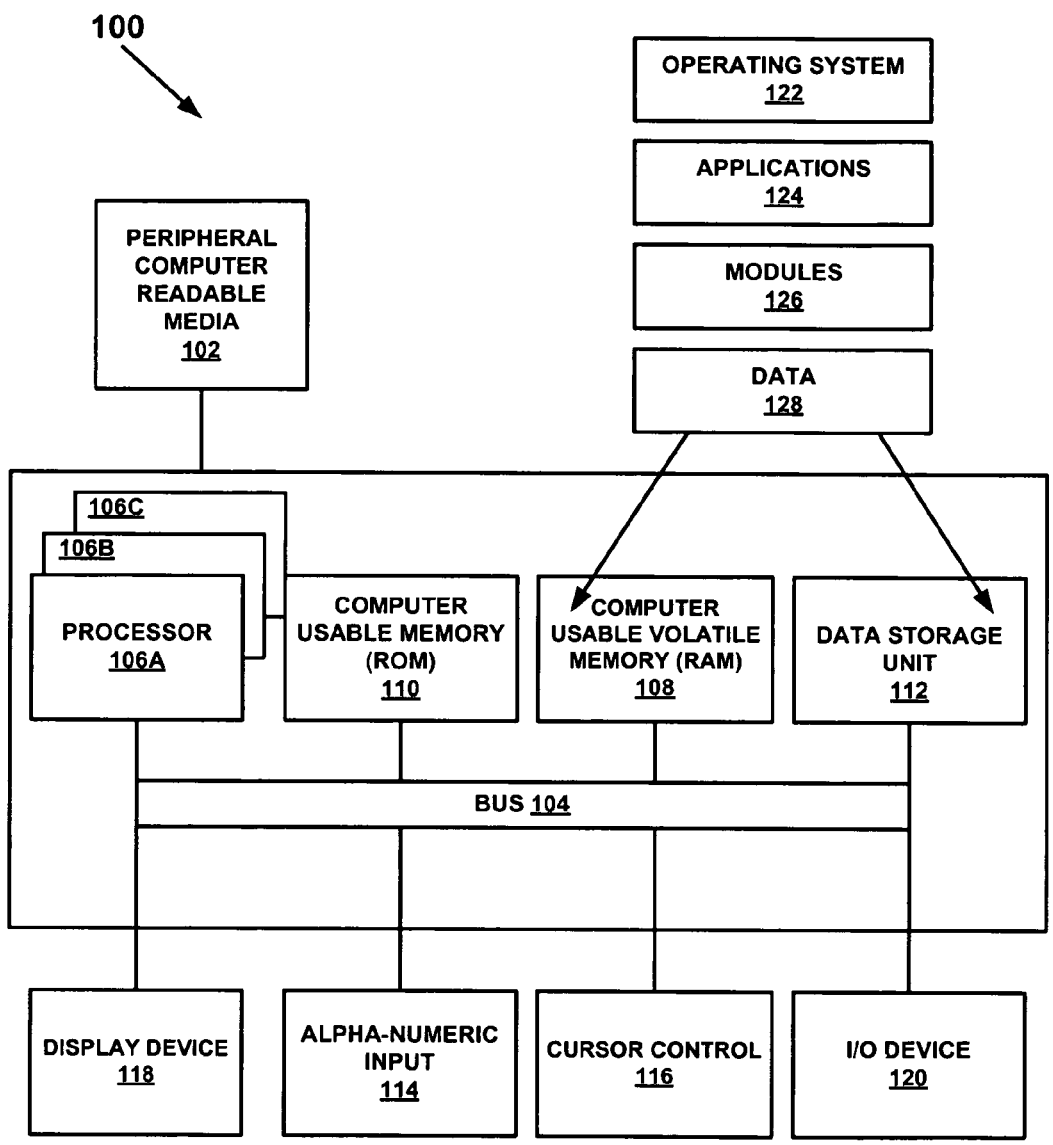
FIG. 1 is a diagram of an exemplary computer system used in accordance with embodiments of the present invention.

With reference now to FIG. 1, portions of the present invention are composed of computer-readable and computer-executable instructions that reside, for example, in computer-usable media of a computer system. That is, FIG. 1 illustrates one example of a type of computer that can be used to implement embodiments, which are discussed below, of the present invention. FIG. 1 illustrates an exemplary computer system 100 used in accordance with embodiments of the present invention. It is appreciated that system 100 of FIG. 1 is exemplary only and that the present invention can operate on or within a number of different computer systems including general purpose networked computer systems, embedded computer systems, routers, switches, server devices, client devices, various intermediate devices/nodes, stand alone computer systems, multi-media devices, image display devices, digital cameras, handheld electronic devices, and the like. As shown in FIG. 1, computer system 100 of FIG. 1 is well adapted to having peripheral computer readable media 102 such as, for example, a floppy disk, a compact disc, digital versatile disk, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information. The RAM, memory 110, and storage 112 that store information and instructions for processors 106A-106C are examples of computer readable storage medium.

Referring still to FIG. 1, optional display device 118 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to receiving inputs (such as alphanumeric inputs) and/or to having a cursor directed by other means such as, for example, voice commands. Additionally, in some embodiments, alphanumeric input 114 is configured for inputting non-alphabetic language characters, such as Kanji characters. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present invention, for example, is stored as an application 124 or module 126 in memory locations within RAM 108 and/or memory areas within data storage unit 112.

General Description of the Present Technology For Image Layout Constraint Generation The present technology for image layout constraint generation provides methods and systems for generating image layout constraints to apply to image data for an image, a group of images, a video clip, or a combination of images and video being arranged for presentation in a display such as a slide show. This is useful, because the unconstrained solution set of image layouts for such presentations can in many cases be nearly infinite. By adding constraints selectively and/or randomly, embodiments of the present invention reduce computing resources and time required for calculating layouts and evaluating layouts as compared to an unconstrained solution set.

For example, as will become evident, one embodiment of the present invention provides means for automatically selecting some constraints based on an analysis of image content. This "intelligent" selection of constraints serves to enhance the presentation of images by identifying important features in images so they are not obscured or minimized and are instead accentuated when possible. Likewise, an embodiment of the present invention also allows a user to provide some image analysis inputs which are utilized to generate constraints. In one embodiment, simple user inputs are also used to govern the generation of constraints which shape the stylistic look of the presentation. Additionally, in one embodiment, one or more random elements of image layout are constrained. Among other things, such random constraints can be used to reduce the solution set to a tractable size for the computing device or program that will be generating trial layouts or evaluating trial layouts. Further, such random constraints also help ensure that presentations generated with methods and systems of the present invention are not stale and repetitive, either within a single presentation, or across multiple presentations.

These layout constraints are then made available, in one embodiment, to generate a number of trial layouts from image data. In such an embodiment, the trial layouts can then be analyzed to output an optimum layout or set of layouts for visually presenting an image, images, video, or some combination thereof, for example, in a slide show type presentation. Thus, the present technology provides methods and systems which allow creation of automated or semi-automated image presentations which are comprised of image layouts that typically accentuate the content being displayed and are not repetitive or bland in nature. Further, the present technology allows user input into the generation of constraints for image layouts, by means of simple controls which are easy to operate without requiring training, practice, or particular skill on the part of the user.

Overview of Discussion

Figure 2:
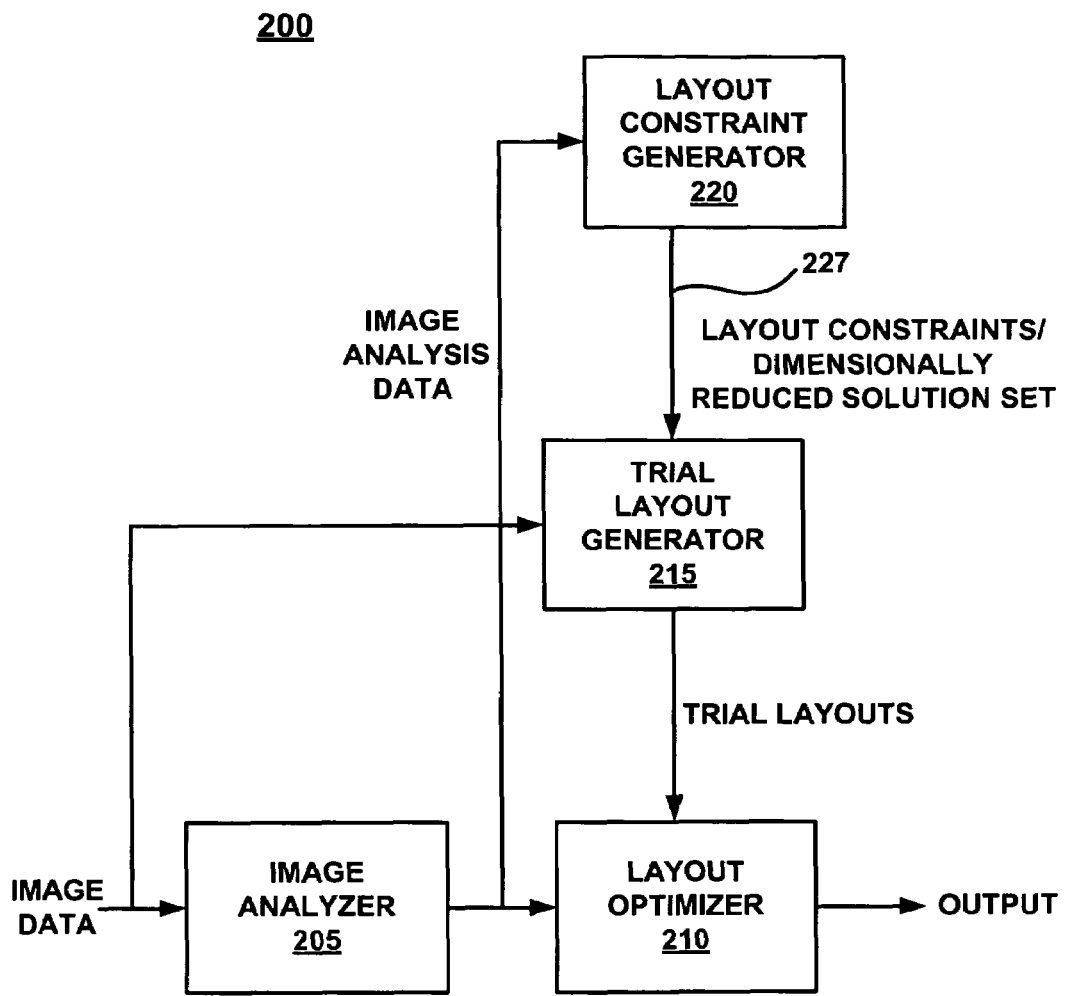
FIG. 2 is a block diagram of an exemplary system for generation of an image presentation, according to one embodiment of the present invention.

FIG. 2 shows a block diagram of components of an exemplary system 200 which can be used to generate an optimized image presentation. By way of example, and not of limitation, system 200 is used, in one embodiment, to generate optimized slide show type presentation from image data for an image, group of images, video, or some combination thereof. System 200 is illustrated and to provide a framework which shows one use for an exemplary layout constraint generator 220. The following discussion will begin with a brief description of the structure and general operation of system 200. Discussion will move to a description of the structure of layout constraint generator 220. Discussion will then turn to a description of the components of layout constraint generator 220 used in an exemplary method for generating a dimensionally tractable set of image layout constraints. Discussion will then proceed to a description of components of layout constraint generator 220 used in an exemplary method for generating image layout constraints. Although line drawings are used in conjunction with the examples illustrated herein, it should be appreciated that these line drawings (i.e., images shown in FIG. 6) represent exemplary digital images and/or photographs that the technology described herein is intended to operate upon or in conjunction with.

Exemplary System For Generating Optimized Image Presentations

With respect to the structure, system 200 is comprised of an image analyzer 205, a layout optimizer 210, a trial layout generator 215, and a layout constraint generator 220. As shown in FIG. 2, image analyzer 205 and trial layout generator 215 both receive image data, such as digital representations of images, as an input.

Image analyzer 205 receives image data as an input and utilizes one or more of a plurality of image analysis techniques that are known in the art to perform the analysis of image data to locate objects and/or identify salient regions and features within an image. As an example, in one embodiment, image analyzer 205 analyzes the content of image data for each image or video frame image to locate more salient and less salient regions or objects within the image. In one such embodiment, image analyzer 205 outputs image analysis data in the form of saliency maps of analyzed images.

Techniques for recognizing objects and determining salient (or interesting) portions of images are known, and described in works such as, A Model of Saliency-Based Visual Attention for Rapid Scene Analysis, Laurent Itti, Christof Koch, and Ernst Niebur, IEEE Transactions on Pattern Analysis and Machine Intelligence, November 1998; and Robust Real-Time Object Detection, Paul Viola and Michael Jones, Second International Workshop on Statistical and Computational Theories of Vision—Modeling, Learning, Computing, and Sampling, Jul. 13, 3001.

Saliency maps typically provide a corresponding mapping of salient regions for a particular image. Typically the salience for an image region, which may be as small as a pixel of an image, has a corresponding score in the saliency map/data. For example, a saliency map of an image may be comprised of a grey-scale map of the associated image. In such a saliency map, saliency values may be assigned on a scale, for example from 0 to 255, with the highest saliency represented by a white pixel and a value of 255 and the lowest saliency represented by a black pixel and a value of 0. Thus, in such a fashion, image analyzer 205 marks salient features such as objects, faces, and what appear to be interesting regions of an image. Saliency maps, and other image analysis data are output from image analyzer 205 and coupled to layout optimizer 210 and layout constraint generator 220 as inputs.

Layout constraint generator 220 is used to generate layout constraints which are used to determine layouts of images. Layout constraint generator 220 generates constraints that may be applied to a layout of an image or images that is intended to be stationary (e.g., a single projected or printed display of one image or a plurality of images with share a viewing region). Layout constraint generator 220 also generates constraints that may be applied to an image layout of an image, images, video, or combination thereof that is intended for a time variant display (e.g., a slide show type presentation which cycles through various layouts and in which an image or images in a particular layout may move within or be panned across the presentation viewing region). Layout constraints include constraints on image size, x-y location, z-ordering, movement, speed of movement, zooming, panning, color of images, tempo of display, fade-ins, fade-outs, rotation, overlap between images, image regions which are marked for prominent display, image cropping, presentation theme, and etc.

As will be further described, in various embodiments, layout constraint generator 220 generates constraints based on automated image analysis, user input, default settings, and random selection. Layout constraint generator 220 outputs a generated set of layout constraints which define a dimensionally reduced solution set via output 227 which is coupled to trial layout generator 215. These constraints limit the solution space for the number and type of layouts that can be generated from image data from an image, group of images, video, or combination thereof. In order to simplify description of the present invention, and in particular the operation of layout constraint generator 220, examples and descriptions which follow will be directed to use of layout constraint generator 220 with one image or a group of images.

Trial layout generator 215 receives generated layout constraints which define the dimensionally reduced solution set along with image data as inputs. Trial layout generator 215 employs the layout constraints received via coupling 227 to generate one or more trial layouts of the images from the image data that is also received as an input. Constraining layouts reduces the dimensions of freedom with which any group of images can be arranged and thus reduces the solution set by reducing the number of permutations of possible trial layouts that trial layout generator is required to generate. This also reduces the amount of time required to generate trial layouts and thus speeds creation of a presentation. Trial layout generator 215, outputs generated trial layouts to layout optimizer 210.

Layout optimizer 210 receives image analysis data and trial layouts as inputs. Layout optimizer 210 employs image analysis data to score each received image layout for a particular group of images and then select an optimum layout that receives the best score. To perform such scoring and selecting, layout optimizer 210 uses one or more of a variety of layout optimization techniques. For example, in one embodiment layout optimizer 210 calculates the cost of any occluded, cropped, or other wise non-visible areas of images in a layout. In other embodiments, layout optimizer 210 also selects for trial layouts which maximize the display the more salient portions of images while minimizing the display of the less salient portions of images. The layout from a group of trial layouts which is deemed optimum is then output, for example, to a display or as part of a presentation such as a slide show type presentation.

Exemplary Layout Constraint Generator

Figure 3:
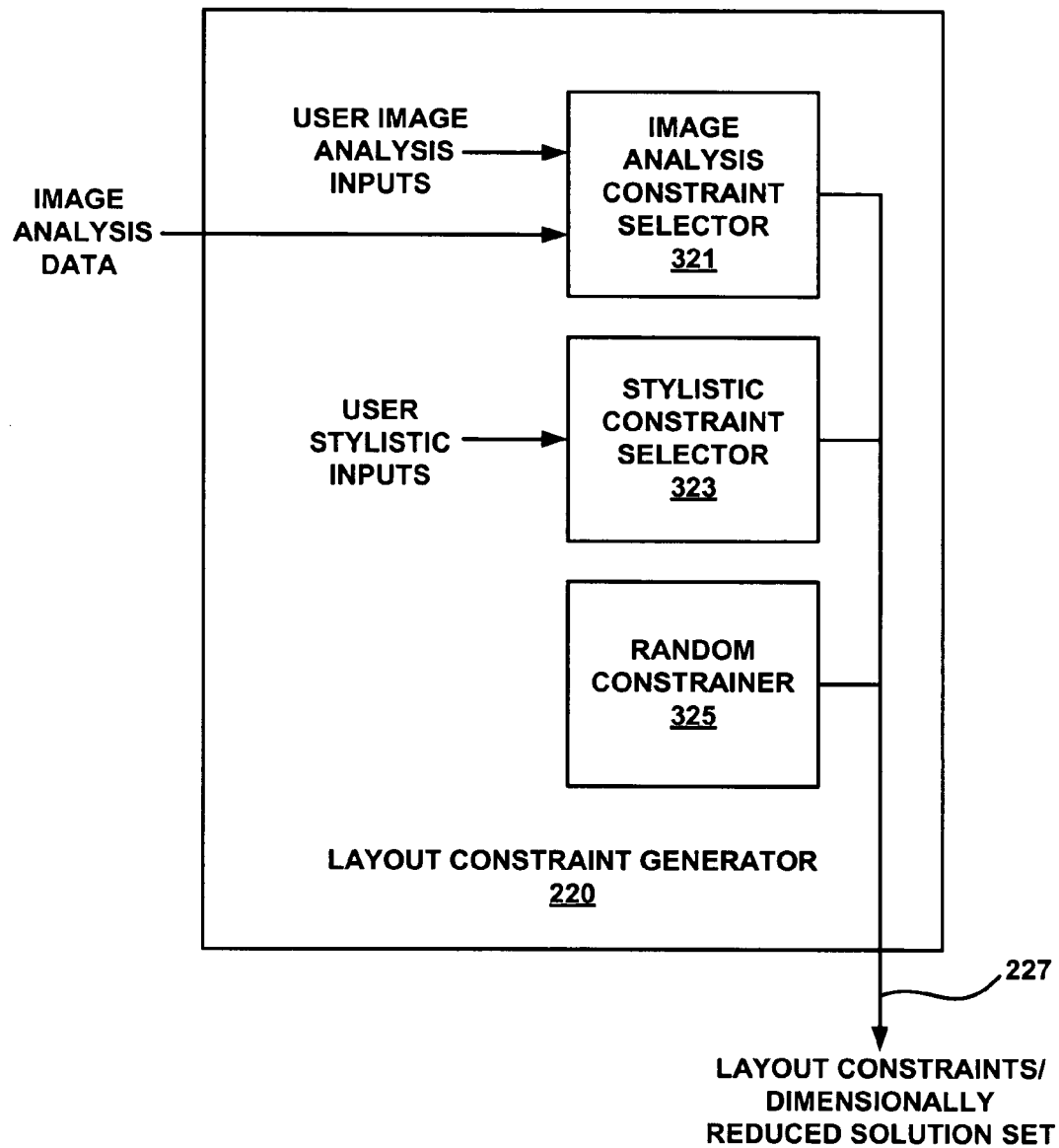
FIG. 3 is a block diagram of an exemplary layout constraint generator according to one embodiment of the present invention.

FIG. 3 is a block diagram of exemplary layout constraint generator 220, according to one embodiment of the present invention. Layout constraint generator 220 is comprised of an image analysis constraint selector 321, a stylistic constraint selector 323, and random constrainer 325. As shown in FIG. 3, image analysis constraint selector 321, a stylistic constraint selector 323, and a random constrainer 325 are all coupled to one another and to a common output 227. This coupling allows for interchange of information, as required, between elements of layout constraint generator 220. This coupling also allows layout constraint generator 220 to output layout constraints which define dimensionally reduced layout solution sets for use, for example, by other elements of system 200 (FIG. 2) such as trial layout generator 215.

Image analysis constraint selector 321 is configured, in one embodiment, for generating one or more layout constraints based upon an analysis of one or more images or their corresponding image analysis data. For example, in one embodiment, the analysis is automated and is performed by examining and interpreting the image analysis data that is provided as an input. Such analysis includes, for example: automated determination of more salient and less salient portions of images, automatic location of faces in images, automated determination of a dominant line in an image, automated determination of image brightness, automatic determination of color variance in an image, and automated determination of resolution of an image.

This automated analysis allows image analysis constraint selector 321 to generate image analysis constraints which govern, for example, which portions of each image should be displayed (such as through zooming, panning, cropping, or visibility when partially overlapped by another image). Such constraints also govern whether and how much zooming or scaling will be allowed based on, for example, the resolution of a salient region of an image. Constraints also specify which portions of an image should be cropped, covered, or otherwise minimized in display when possible. Image analysis constraint selector 321 also generates constraints on movement of an image and panning of an image based on, for example, a dominant line (if present) of an image. Thus, in one embodiment, for example, image analysis constraint selector 321 generates a constraint which allows panning or moving of an image if a dominant line is detected, and likewise generates a constraint that no panning or movement is allowed if there is no dominant line detected. In such an embodiment, image analysis constraint selector 321 is configured to image analysis constraints, based on automated image content analysis of images, which reduce sub-optimal and undesirable trial image layouts that would otherwise be produced and evaluated in the absence of such constraints. These constraints based on image content analysis also promote generation of trial layouts which accentuate desirable characteristics (such as salient regions) of an image detected through image analysis, and similarly minimize undesirable characteristics (such as regions of low salience in an image).

In one embodiment, image analysis constraint selector 321 complements the automated analysis with user image analysis inputs. In such an embodiment, image analysis constraint selector 321 is configured for generating one or more image analysis layout constraints based wholly or partially upon a user image content analysis of images or image analysis data of images. For example, in one embodiment, a user is allowed to make simple selections as to which portions of images which should be given high priority for display and/or which portions of images which should be given low priority for display. In one embodiment a user also marks or validates locations of faces and other objects of high salience. Likewise, in some embodiments a user marks or validates cropping choices and dominant line directions for one or more of the images being analyzed. Image analysis constraint selector 321 uses these and other similar user inputs, along with automated inputs, as the basis for generating constraints, for example, to perform a particular crop on an image, display a particular part of an image, not display a particular part of an image, to allow zooming on a particular portion of an image, to allow panning or moving of a particular image, and etc.

Stylistic constraint selector 323 is configured, in one embodiment, for generating one or more layout constraints based on a selected presentation style, such as a time variant slide show type presentation style, of an image or images. Such stylistic constraints may automatically be generated from automatically selected or user defined default settings or be based upon simple user inputs which control automated generation of stylistic constraints that shape the presentation style used to display one or more images. Such stylistic layout constraints are generated, for example, from automated and/or user selected inputs for presentation styles including: image presentation tempo (speed of motion, speed of panning, amount of time images are displayed, abruptness of changes between layouts, and etc.); number of images per layout (e.g., one image, more than one image, variable number of images, and etc.); image theme (e.g., color saturation and/or harmoniousness of the presentation, and etc.), and other stylistic presentation style inputs.

Random constrainer 325 is configured, in one embodiment, for randomly generating zero or more layout constraints of a dimensional solution space that is associated with a presentation, such as a time variant slideshow type presentation, of an image or images. In one embodiment, random constrainer 325 generates enough such random constraints to limit the dimensionality of a solution space to a tractable level that is optimally computationally feasible for a particular computing resource such as piece of image presentation software or a particular processor or computational resource that is responsible for processing layouts or presentations that are generated from the image layout constraints. In one embodiment, random constraints are only generated to constrain otherwise unconstrained dimensions of a solution space. Thus, random constrainer 325 analyzes layout constraints from image analysis constraint selector 321 and stylistic constraint selector 323, remaining unconstrained dimensions of the solutions space, and capabilities of a computational resource.

In one embodiment, based on this analysis, random constrainer 325 may determine that a solution space is not yet tractable. In response, random constrainer 325 then randomly constrains enough dimensions of a solution set to bring the set solution set into the range of optimum tractability for a computational resource. In one embodiment, for layouts of a particular image or set of images, random constrainer 325 accomplishes this by generating layout constraints which constrain dimensions that have not previously been constrained by an image analysis constraint or by a stylistic constraint. This can comprise generating exactly enough layout constraints to make the solution set tractable or more than enough layout constraints to make the solution set tractable.

Similarly, in one embodiment, based on this analysis, random constrainer 325 may determine that a solution space is already tractable to a computational resource because of sufficient constraint or over constraint. In response, random constrainer 325 then randomly generates either no layout constraint or else randomly generates one or more additional layout constraints. By randomly generating additional layout constraints, random constrainer 325 either speeds up the trial layout generation process and presentation generation process, provides for variation in the resulting trial layouts generated from the constraints, or both.

Likewise, in one embodiment, based on this analysis, random constrainer 325 may determine that a solution space is not tractable to a computational resource because of under constraint. In response, random constrainer 325 then randomly generates either no layout constraints, or else fewer constraints than are needed to bring the solution set into optimum tractability for the computational resource. By occasionally (such as at random) not generating constraints or generating fewer restraints than optimally required, random constrainer 325 sets up a situation where the computational resource may be slightly overloaded. The computational resource will not be able to perform an exhaustive search of the solution space, so at some point will have to provide a "best I have so far" type solution. This forces the computational resource to do the best job it can in the time that it is allowed. In such cases, random constrainer 325 adds to variation of the resulting layouts by leaving extra unconstrained dimensions in play during processes such as trial layout generation and presentation optimization.

In one embodiment, random constrainer 325 also consolidates constraints selected by image analysis constraint selector 321 and stylistic constraint selector 323 along with any random constraints generated by random constrainer 325. The consolidated constraints are then coupled to output 227 as a set of set of constraints which define a dimensionally reduced solution set for image layout. In other embodiments, the consolidation functionality can also reside in layout constraint generator 220 or other elements or layout constraint generator 220.

Exemplary Methods of Operation

The following discussion sets forth in detail the operation of present invention through description of exemplary embodiments. With reference to FIGS. 4 and 7, flow diagrams 400 and 700 each illustrate exemplary steps used by various embodiments of the present invention. Flow diagrams 400 and 700 include processes that, in various embodiments, are carried out by a processor under the control of computer-readable and computer-executable instructions. The computer-readable and computer-executable instructions reside, for example, in peripheral computer readable media 102 or in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 400 and 700, such steps are exemplary. That is, embodiments are well suited to performing various other steps or variations of the steps recited in flow diagrams 400 and 700. It is appreciated that the steps in flow diagrams 400 and 700 may be performed in an order different than presented, and that not all of the steps in flow diagrams 400 and 700 may be performed.

Generating a Dimensionally Tractable Set of Layout Constraints

FIG. 4 is a flow diagram 400 of a method, according to one embodiment of the present invention, for generating a dimensionally tractable set of image layout constraints.

At 410 of flow diagram 400, in one embodiment, a selected constraint is applied to limit a dimension of a highly dimensional solution space. The selected constraint is applied by image analysis constraint selector 321 or by stylistic constraint selector 323, and may be an image analysis constraint or a stylistic constraint. Similarly, in one embodiment, a plurality of such image analysis constraints, stylistic constraints, or combination thereof is applied to limit a plurality of the dimensions of a highly dimensional solution space.

Figure 5:
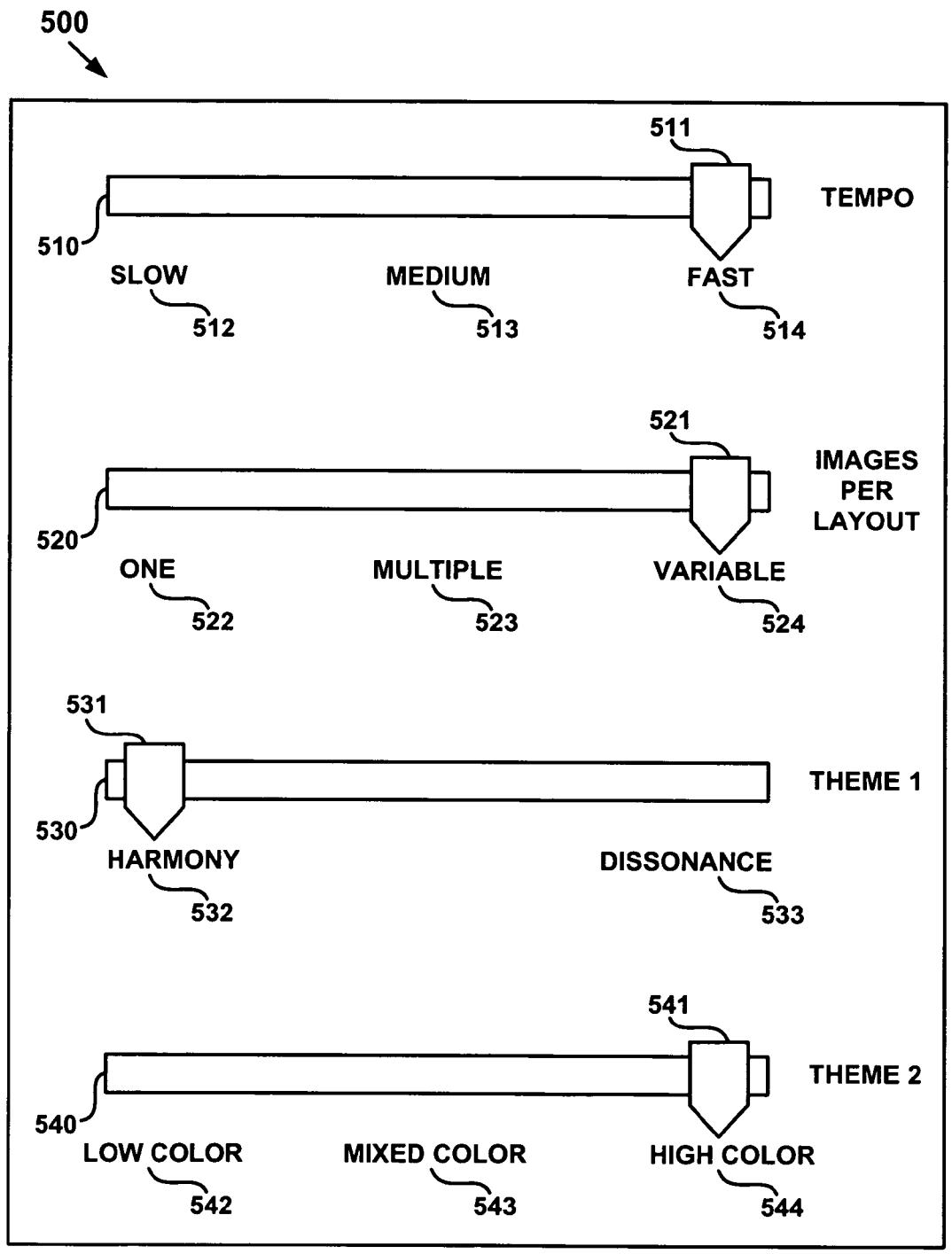
FIG. 5 is a representation an exemplary user stylistic input control panel, according to one embodiment of the present invention.

Stylistic constraint selector 323 selects and applies stylistic constraints that are based upon predefined stylistic defaults, upon a user defined stylistic input, or upon a combination thereof. FIG. 5, discussed below, illustrates one embodiment of a set of simplified stylistic input controls which a user employs to generate user stylistic inputs into stylistic constraint selector 323 or which may contain default settings for stylistic constraint selector 323.

Image analysis constraint selector 321 selects and applies image analysis constraints that are based upon an automated analysis (which employs image analysis data) of image content of an image or set of images, upon a user analysis of image content of an image or set of images, or upon a combination thereof. FIG. 6, discussed below, displays some examples of automatic and user provided image analysis inputs.

At 420 of flow diagram 400, in one embodiment, one or more unconstrained dimensions of the highly dimensional solution space are identified through random selection. The randomly selected constraints, when constrained, further limit the highly dimensional solution space to a dimensionally tractable solution space, wherein tractability of the dimensionally tractable solution space is associated with a capability of a computational resource. Thus in one embodiment, random constrainer 325 receives and analyzes any constraint or constraints applied by image analysis constraint selector 321 and/or stylistic constraint selector 323. Image analysis constraint selector 325 determines how many dimensional degrees of freedom for image layout remain for a particular image or set of images. Image analysis constraint selector 325 also determines (e.g., via a default setting or a polling request) how many unconstrained dimensional degrees of freedom that a particular computational resource, such as a processor or image analysis program can effectively solve for.

In one embodiment, random constrainer 325 then randomly selects and constraints enough unconstrained dimensions to reduce the unconstrained dimensions (degrees of freedom) to a tractable level for the computational resource. Thus, for example, dimensional degrees of freedom may be reduced to one or two dimensions for an embedded device, or four or five dimensions for a high-power personal computer. For example, consider an embodiment where random constrainer 325 determines that ten unconstrained dimensions remain for a layout of a particular set of images. In this example, random constrainer 325 also determines that a computational resource, such as a processor in trial layout generator 215, is optimally capable of generating layouts for the set of images when there are five or fewer unconstrained dimensions of freedom. In response, random constrainer 325 will randomly select and apply enough constraints from the remaining ten unconstrained dimensions to bring the number of unconstrained layout dimensions to five or fewer. So, in such instances, random constrainer 325 may randomly generate five constraints to the remaining unconstrained dimensions by selecting and applying layout constraints. In another such instance random constrainer 325 may instead randomly constrain more than five of the remaining ten unconstrained dimensions, to either speed up the processes of trial layout generation and optimization, to add variation to the resulting presentation, or both.

In another embodiment, random constrainer 325 randomly decides to generate fewer constraints than are required to achieve an optimally tractable solution space for a particular computational resource. For example, consider the embodiment where random constrainer 325 determines that ten unconstrained dimensions remain and the computational resource operates optimally when there are five or fewer unconstrained dimensions. In response, random constrainer 325 randomly constrains four or fewer unconstrained dimensions so that the solution space will remain beyond the optimum tractability of the computational resource. So, in one such instance, random constrainer 325 may generate zero layout constraints to constrain unconstrained dimensions. While in another such instance, random constrainer 325 may generate layout constraints to constrain two, three, or four dimensions.

At 430 of flow diagram 400, in one embodiment, a set of image layout constraints is provided for use in generating a trial image layout, wherein the set of layout constraints defines the dimensionally tractable solution space. In one embodiment, random constrainer 325 accumulates applied layout constraints generated by image analysis constraint selector 321 and stylistic constraint selector 323. After adding any randomly applied constraints to the other accumulated constraints, random constrainer 325 outputs all of these layout constraints on output 227 as a set of layout constraints which define a dimensionally tractable solution space for a particular computational resource. In another embodiment, instead of (or in addition to) outputting the entire set of layout constraints, random constrainer 325 outputs permutations of layout constraints derived from the set of constraints in such a fashion that each permutation can be used to generate a trial layout which falls within the dimensionally tractable solution space.

FIG. 5 is a representation an exemplary user stylistic input control panel 500, according to one embodiment of the present invention. Control panel 500, is comprised of: a tempo control 510 and accompanying tempo selector 511: an images per layout control 520 and accompanying images per layout selector 521; a theme 1 control 530 and accompanying theme 1 selector 531; and a theme 2 control 540 and accompanying theme 2 selector 541. Each of the controls (510, 520, 530, and 540) is shown configured as a slide control wherein an input is selected by positioning an associated selector (511, 521, 531, 541) to an appropriate position on its slide. In one embodiment, controls 500 are configured as selectable regions on a display device, such as display device 118 (FIG. 1) and are manipulated via the use of a cursor control, such as cursor control 116 of computer system 100 (both FIG. 1). It is appreciated that other control means including rotating controls, selectable boxes, drop down menus, and the like, are easily substitutable for those shown within FIG. 5, and are therefore within the scope of the present invention. It is also appreciated that the controls shown in stylistic input control panel 500 are exemplary only, and that other embodiments of a similar control panel are configured with differing or additional user selectable inputs.

Tempo control 510 provides a simplified means for user input to control various elements of the tempo of a presentation of an image or group of images. For example, a user selects a tempo input by positioning slider 511 along the length of tempo control 510 to provide inputs which correspond to slow 512, medium 513, or fast 514. Via input selection from control 510, stylistic constraint selector 323 selects and applies one or more tempo constraints to limit dimensions of a highly dimensional solution set. For example, an input selection of slow 512, medium 513, or fast 514 (as shown) is used to select and apply various tempo related constraints. By way of example, and not of limitation, in one embodiment, a selection of fast 514 corresponds to a constraint of five seconds display time per image layout, a constraint of one second fade-ins, a constraint of one second fade-outs, and when applicable, a constraint of a fast zooming speed and a constraint of a fast panning speed.

Images per layout control 520 provides a simplified means for user input to control the number of images that are placed in each trial layout that is generated for a presentation. For example, a user selects an "images per layout" input by positioning slider 521 along the length of images per layout control 520 to provide inputs which correspond to one image per layout 522, more than one image per layout 523, or a variable number of images per layout 524. Via input selection from control 520, stylistic constraint selector 323 selects and applies constraints to limit dimensions of a highly dimensional solution set by constraining the number of images which will be used in each trial layout. For example, in one instance, an input selection of "one" 522 will result in constraints which cause layouts to be generated with a single image. Likewise, in one instance, an input of "more than one" 523 will result in constraints which cause layouts to be generated which have more than one image in each layout. Similarly, in one instance, an input of "variable" 524 (shown) results in constraints which cause layouts to be generated with either one or more than one image in each layout. It is appreciated that in other embodiments, additional and/or differing images per layout selections may be offered to a user.

Theme 1 control 530 provides a simplified means for user input to control various elements of the theme of a presentation of an image or group of images. For example, a user selects a theme 1 input by positioning slider 531 along the length of theme 1 control 530 to provide inputs which correspond to harmony 532 or dissonance 533. Via input selection from control 530, stylistic constraint selector 323 selects and applies one or more thematic constraints to limit dimensions of a highly dimensional solution set. For example, an input selection of harmony 532 (as shown) is used to select and apply thematic constraints which limit panning to images which have a dominant line, and further constrains panning to a direction parallel to (in harmony with) the dominant line of the panned image. Similarly, an input of dissonance 533 limits panning to images which have a dominant line, and further constrains panning to a direction perpendicular to (in conflict to) the dominant line of the panned image.

Theme 2 control 540 provides a second simplified means for user input to control various elements of the theme of a presentation of an image or group of images. For example, a user selects a theme 2 input by positioning slider 541 along the length of theme 2 control 540 to provide inputs which correspond to low color 542, mixed color 543, or high color 544. Via input selection from control 540, stylistic constraint selector 323 selects and applies one or more thematic constraints to limit dimensions of a highly dimensional solution set. By way of example and not of limitation, an input selection of high color 544 (as shown) is used to select and apply thematic constraints which group images of similar color or complementary color into layouts which contain multiple images or into a series of layouts. Likewise, a selection of high color 544 applies a thematic constraint which precludes or diminishes the display of images which do not have vibrant colors. Similarly, where applicable, a selection of high color 544 also applies thematic constraints which promote zooming to or from and panning across vibrantly colored portions of images within a layout.

In one embodiment, controls 510, 520, 530, and 540 (and others if used) are configured with automatic or user defined default stylistic constraint settings for presentation style which are utilized as inputs by stylistic constraint selector 323 to select and apply constraints in the absence of user alteration of the default settings. For example, in one embodiment a default presentation style is comprised of a tempo control 510 with a default setting of medium 513, an images per layout control 520 with a default setting of "one" 522, a theme 1 control with a default setting of harmony 532, and theme 2 control with a default setting of mixed color 543.

FIG. 6 shows exemplary images 610 and 620 upon which embodiments of the present invention may be practiced.

Referring to image 610, airplane 611 represents a salient object (interesting object) which image analysis constraint selector 321 identifies automatically via image analysis data which is received as an input. Likewise, region 615 is an automatically identified region of image 610 which has little or no salience. In one embodiment, in response to the automatic identification of such objects and regions, image analysis constraint selector 321 selects and applies one or more image analysis constraints. By way of example, in one embodiment, image analysis constraint selector 321 selects and applies a constraint which cause object 611 to be displayed in any layout which contains image 610. Likewise, in one embodiment, image analysis constraint selector 321 selects and applies a constraint which causes region 615 to be cropped, overlapped, minimized, or not displayed in any layout which contains image 610.

In FIG. 6, line 613 represents the directions of a dominant line of image 610 corresponding to the length of airplane 611. In one embodiment, dominant line 613 has been identified via a user image analysis input to image analysis constraint selector 321. In response to the user identification of dominant line 613 (or to some other user input) image analysis constraint selector 321 selects and applies one or more image analysis constraints. By way of example and not of limitation, in one embodiment, image analysis constraint selector 321 selects and applies a constraint which permits harmonious panning of image 610 in directions parallel to dominant line 613 and a constraint which permits dissonant panning of image 610 in directions perpendicular to dominant line 613.

Referring to image 620, person 622 represents a salient object (interesting object) which image analysis constraint selector 321 identifies automatically via image analysis data which is received as an input. Likewise, region 626 is an automatically identified region of image 620 which has little or no salience. In one embodiment, in response to the automatic identification of objects and regions, image analysis constraint selector 321 selects and applies one or more image analysis constraints. By way of example, in one embodiment, image analysis constraint selector 321 selects and applies a constraint which causes object 622 to be displayed in any layout which contains image 620. Likewise, in one embodiment, image analysis constraint selector 321 selects and applies a constraint which causes region 626 to be cropped, overlapped, minimized, or not displayed in any layout which contains image 620.

Dashed circle 624 represents a region of very high salience (a face) which has been identified in image 620. In one embodiment, region 624 has been automatically identified by image analysis constraint selector 321 from image analysis data received as an input. Moreover, in one such embodiment, a user image analysis input has also been received by image analysis constraint selector 321 to confirm the proper identification of region 624 as a region of very high salience. In response to the identification of region 624, or other similar region of very high salience, image analysis constraint selector 321 selects and applies one or more image analysis constraints. By way of example and not of limitation, in one embodiment, image analysis constraint selector 321 selects and applies a constraint which permits zooming to and from and/or enlargement of region 624 of image 620.

Generating Image Layout Constraints

FIG. 7 is a flow diagram 700 of a method, according to one embodiment of the present invention, for generating image layout constraints.

At 705 of flow diagram 700, in one embodiment, a selected layout constraint is utilized to narrow a set of layout dimensions into a limited set of layout dimensions. In one such embodiment, the utilized constraint is a layout constraint that is selected and applied by image analysis constraint selector 321 or stylistic constraint selector 323 to narrow a previously unconstrained set of layout dimensions.

For example, in one instance, this comprises utilizing an automatically selected layout constraint to narrow the set of layout dimensions. In one embodiment, the automatically selected layout constraint is selected and applied by image analysis constraint selector 321 and is based upon either an automated analysis of image content, a user analysis of image content, or a combination thereof. The description of FIG. 6 details examples of how image analysis constraint selector selects and applies image analysis layout constraints based on user inputs and automated image analysis inputs.

In another instance, this comprises utilizing a selected layout constraint that is based on a stylistic input to narrow the set of layout dimensions to create a limited set of layout dimensions. The stylistic input is based on a user stylistic input, a default stylistic input setting, or a combination thereof. Stylistic constraint selector 323 is utilized, in one such embodiment to select and apply the utilized constraint that is based on a stylistic input. The description of FIG. 5 details examples of how both default stylistic input settings and user selected stylistic inputs are used by stylistic constraint selector 323 to select and apply stylistic layout constraints.

It is appreciated that in embodiments where more than one selected constraint is utilized to narrow a set of layout dimensions into a limited set of layout dimensions, the selected constraints are selected and applied by image analysis constraint selector 321, stylistic constraint selector 323, or both.

At 715 of flow diagram 700, in one embodiment, at least one random layout constraint is utilized to narrow the limited set of layout dimensions into a reduced set of layout dimensions. The reduced set of layout dimensions has more constraints and fewer dimensional degrees of freedom for image layout than the limited set of layout dimensions. Random constrainer 325 randomly selects and applies the utilized constraints. In one embodiment random constrainer 325 analyzes the limited set of layout dimensions, which is comprised unconstrained dimensions remaining after application of constraints selected and applied by image analysis constraint selector 321, stylistic constraint selector 323, or both. Through this analysis, random constrainer 325 determines which dimensions in the limited set of layout dimensions remain unconstrained. Random constrainer 325 randomly selects and applies one or more constraints (as previously described) to one or more unconstrained dimensions of the limited set of layout dimensions. In one embodiment, random constrainer 325 also randomly selects and applies further constraints to already constrained dimensions.

In one embodiment, the purpose of the application of random constraints is to reduce the limited set of layout dimensions to a reduced set. In one such an embodiment, random constrainer 325 does this by applying enough (or more than enough) random constraints to unconstrained dimensions to reduce the limited set of layout dimensions to a tractable dimensionality associated with a computational resource, such as a processor or imaging program in a trial layout generator or a layout optimizer. Thus, for example, if the limited set of layout dimensions has ten dimensional degrees of freedom and the reduced set of layout dimensions needs to have five or fewer degrees of freedom to be tractable, random constrainer 325 randomly selects and applies layout constraints to constrain at least five of the unconstrained degrees of freedom.

In another embodiment, if the limited set of layout dimensions is already a tractable solution set, random constrainer 325 still randomly selects and applies one or more constraints to constrained or unconstrained dimensions of the limited set of layout dimensions. This introduces randomness into the reduced set of layout dimensions so that resulting trial image layouts and presentations generated from the reduced set of layout dimensions will not seem bland and highly repetitive to a user.

In random constrainer 325 randomly applies less than the number of constraints required to bring the solution set into the range of optimum tractability for the computational resource. Consider the previous example where ten dimensional degrees of freedom remain and optimum tractability will be achieved with five or fewer degrees of freedom. In this embodiment, random constrainer 325 will randomly select and apply four or fewer constraints. Thus a greater number of unconstrained dimensions will remain in the solution set than is optimally tractable to the computing resource. This introduces randomness into the reduced set of layout dimensions by occasionally creating a set of dimensions which will force the computational resource to provide a "best that I've found so far" type solution.

At 725 of flow diagram 700, in one embodiment, the reduced set of layout dimensions is employed to specify a set of image layout constraints for a time variant display of images. In one embodiment, random constrainer 325 consolidates a set of layout constraints from the constraints that have been used to limit and reduce the set of layout dimensions. Random constrainer 325 combines this consolidated this set of constraints with the remaining unconstrained dimensions of the reduced set of layout dimensions to specify a set of image layout constraints for a time variant display, such as a slideshow type presentation, of an image or set of images.

In another embodiment, random constrainer 325 further determines a plurality of constraint permutations from the specified set of layout constraints. Each constraint permutation results in a unique image layout when applied to a set of images, for example, by a trial layout generator. With reference now to images 610 and 620 of FIG. 6, one example of such a permutation may dictate a layout that displays image 620 alone. Following this example, the permutation may also further require that image 620 is cropped in a certain manner so that region 626 is removed, that the cropped image is displayed stationary in the center of a viewing region for a particular amount of time until a new layout is then displayed, and further that very salient region 624 is zoomed in upon at a slow zoom speed while the cropped image is being displayed.

At 735 of flow diagram 700, in one embodiment, the set of image layout constraints is provided for use in generating a set of trial layouts for the time variant display of images. In one such embodiment, random constrainer 325 provides the selected set of image layout constraints (previously described in conjunction with block 725) as an output on output line 227. Output line 227 is coupled to trial layout generator 215 (FIG. 2), or some similar element, for use in generating one or more trial layouts for evaluation or for use in a time variant display, such as a slideshow type presentation, of an image or set of images.

Although the subject matter of the present invention has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a dimensionally tractable set of image layout constraints, said method comprising:
  applying, performed by a computer, a selected constraint to limit a dimension of a highly dimensional solution space; and
  identifying, performed by said computer, through random selection one or more unconstrained dimensions of said highly dimensional solution space, which when constrained will further limit said highly dimensional solution space to a dimensionally tractable solution space, wherein tractability of said dimensionally tractable solution space is associated with a capability of a computational resource.

2. The method as recited in claim 1, further comprising:
  providing a set of image layout constraints for use in generating a trial image layout, wherein said set of layout constraints defines said dimensionally tractable solution space.

3. The method as recited in claim 1, wherein said applying a selected constraint to limit a dimension of a highly dimensional solution space comprises:
  basing said selected constraint upon a user defined stylistic input.

4. The method as recited in claim 1, wherein said applying a selected constraint to limit a dimension of a highly dimensional solution space comprises:
  basing said selected constraint upon an automated analysis of image content.

5. The method as recited in claim 1, wherein said applying a selected constraint to limit a dimension of a highly dimensional solution space comprises:
  basing said selected constraint upon a predefined default.

6. A computer implemented method for generating image layout constraints, said method comprising:
  utilizing, performed at a computer, a selected layout constraint to narrow a set of layout dimensions into a limited set of layout dimensions;

utilizing, performed at said computer, at least one random layout constraint to narrow said limited set of layout dimensions into a reduced set of layout dimensions; and employing, performed at said computer, said reduced set of layout dimensions to specify a set of image layout constraints for a time variant display of images.

7. The computer implemented method as recited in claim 6, further comprising:

providing said set of image layout constraints for use in generating a set of trial layouts for said time variant display of images.

8. The computer implemented method as recited in claim 6, wherein said utilizing a selected layout constraint to narrow a set of layout dimensions into a limited set of layout dimensions comprises:

utilizing an automatically selected layout constraint to narrow said set of layout dimensions, wherein said automatically selected layout constraint is based upon an analysis of image content.

9. The computer implemented method as recited in claim 6, wherein said utilizing a selected layout constraint to narrow a set of layout dimensions into a limited set of layout dimensions comprises:

utilizing a selected layout constraint based on a stylistic input to narrow said set of layout dimensions to create said limited set of layout dimensions.

10. The computer implemented method as recited in claim 6, wherein said utilizing at least one random layout constraint to narrow said limited set of layout dimensions into a reduced set of layout dimensions comprises:

applying said random layout constraint to constrain an unconstrained dimension of said limited set of layout dimensions.

11. The computer implemented method as recited in claim 6, wherein said utilizing at least one random layout constraint to narrow said limited set of layout dimensions into a reduced set of layout dimensions comprises:

applying enough of said random constraints to reduce said limited set of layout dimensions to a tractable dimensionality associated with a computational resource.

12. The computer implemented method as recited in claim 6, wherein said employing said reduced set of layout dimensions to specify a set of image layout constraints for a time variant display of images comprises:

determining a plurality of constraint permutations from said set of image layout constraints, wherein each constraint permutation results in a unique image layout when applied to a set of images.

13. A system for generating layout constraints for a time variant display of images, said system comprising:

computer readable storage medium with instructions stored thereon that when executed by a processor implement:

an image analysis constraint selector configured for generating a layout constraint based upon an analysis of said images;

a stylistic constraint selector configured for generating a layout constraint based on a selected presentation style of said time variant display of images; and a random constrainer configured for randomly generating a layout constraint of a dimensional solution space associated with said time variant display of images.

14. The system of claim 13, further comprising:

a coupling to a layout generator, said coupling configured for providing said generated layout constraints to said layout generator for use in generating a plurality of trial layouts of said images.

15. The system of claim 13, wherein said image analysis constraint selector is configured for generating a layout constraint which reduces sub-optimal trial image layouts and is based upon an automated image content analysis of said images.

16. The system of claim 13, wherein said image analysis constraint selector is configured for generating a layout constraint based upon a user image content analysis of said images.

17. The system of claim 13, wherein said presentation style comprises:

a user selectable image presentation tempo.

18. The system of claim 13, wherein said presentation style comprises:

a default presentation style.

19. The system of claim 13, wherein said presentation style comprises:

a user selectable image theme.

20. The system of claim 13, wherein said random constrainer is configured to randomly generate enough of said random layout constraints to reduce said dimensional solution space to a tractable dimensionality associated with a computational resource.

* * * * *